Aug. 11, 1964     A. E. LA POINTE     3,143,965
CHAFF DISPENSER

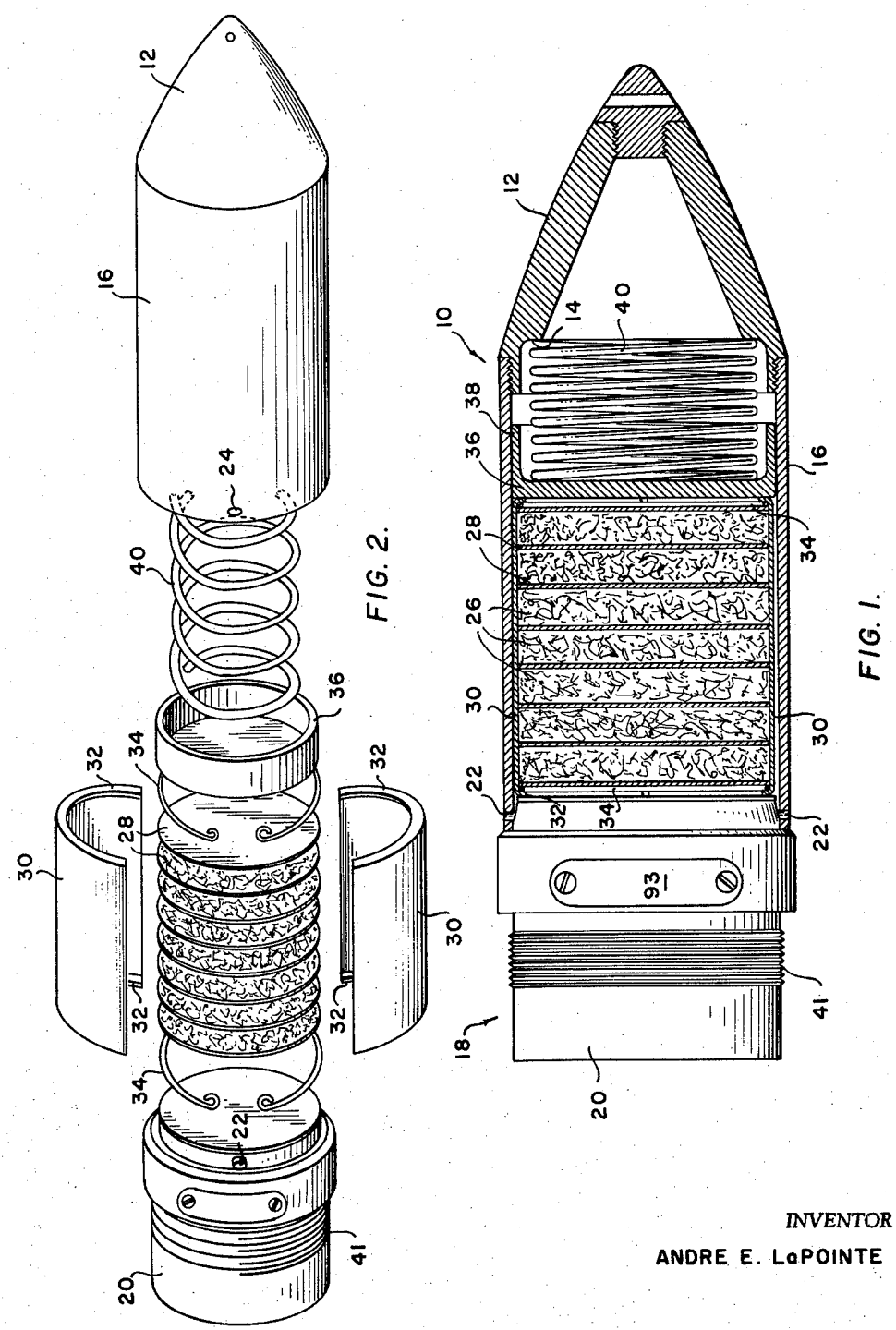

Filed Nov. 6, 1959     3 Sheets-Sheet 2

INVENTOR
ANDRE E. LaPOINTE

BY B. L. Zangwill
ATTORNEYS 3,143,965
CHAFF DISPENSER
Andre E. La Pointe, Rockville, Md., assignor to the United States of America as represented by the Secretary of the Navy
Filed Nov. 6, 1959, Ser. No. 851,483
8 Claims. (Cl. 102—34.4)
(Granted under Title 35, U.S. Code (1952), sec. 266)

The invention described herein may be manufactured and used by or for the Government of the United States of America for governmental purposes without the payment of any royalties thereon or therefor.

This invention relates to a rocket head and more particularly to a rocket head adapted to disperse a quantity of radar reflective material at a predetermined time after launching of a rocket, for the purposes of tracking high altitude wind currents.

In accordance with prior art practice, high altitude wind currents have generally been tracked by launching balloons into the atmosphere and either visually or electronically tracking said balloons when they reach a predetermined altitude by use of radio and/or radar. Such a practice however, has material disadvantages. For example, the balloons generally in use take a very considerable time, often as long as four hours, to rise to 90,000 feet, at which altitude the wind currents under observation are frequently found. This prolonged time delay results in a delay in obtaining vital information in an emergency, and due to the very high velocities of the wind at high altitudes the balloon may be blown out of the area in question or blown beyond the range of the tracking equipment.

The instant invention comprises a hollow rocket head having contained therein a quantity of light-weight radar reflective material such as a large number of dipoles. The instant rocket head also includes a means for ejecting the radar reflective material at a predetermined time after launching of a rocket to which the head is attached. The ejecting means is actuated in response to the movement of a timer contained in the head. The timer includes a clockwork mechanism and a detonator for causing the elements of the rocket head to separate, whereby the reflective material may be ejected from the head. In actual operation, the timer is set before firing the rocket, the length of time set thereon is determined by the altitude at which it is desired that the reflective material to be ejected from the rocket head, knowing of course the rate of ascent of the rocket. The timer, or clockwork mechanism, remains dormant until the rocket is launched, which launching sets the timer into motion, all as hereinafter described in greater detail.

An object of this invention is to provide a means for tracking high altitude wind currents.

A further object of this invention is to provide a means for dispersing radar reflective material at high altitudes for purposes of radar tracking of wind currents.

Another object of this invention is to provide a rocket projectile head adapted to contain and disperse a quantity of radar reflective material at a predetermined time after launching of the rocket.

Still a further object of this invention is to provide a rocket head having a timer mechanism therein, adapted to automatically disperse a quantity of radar reflective material at a predetermined time interval after launching of the rocket, and in which the timer mechanism is adapted to be activated by the firing of the rocket to which the head is attached.

Other objects and many of the attendant advantages of this invention will be readily appreciated as the same becomes better understood by reference to the following detailed description when considered in connection with the accompanying drawings, wherein:

FIG. 1 is a longitudinal sectional view of the rocket head produced in accordance with the instant invention;

FIG. 2 is an exploded view in perspective, of the structure shown in FIG. 1;

Figure 3:
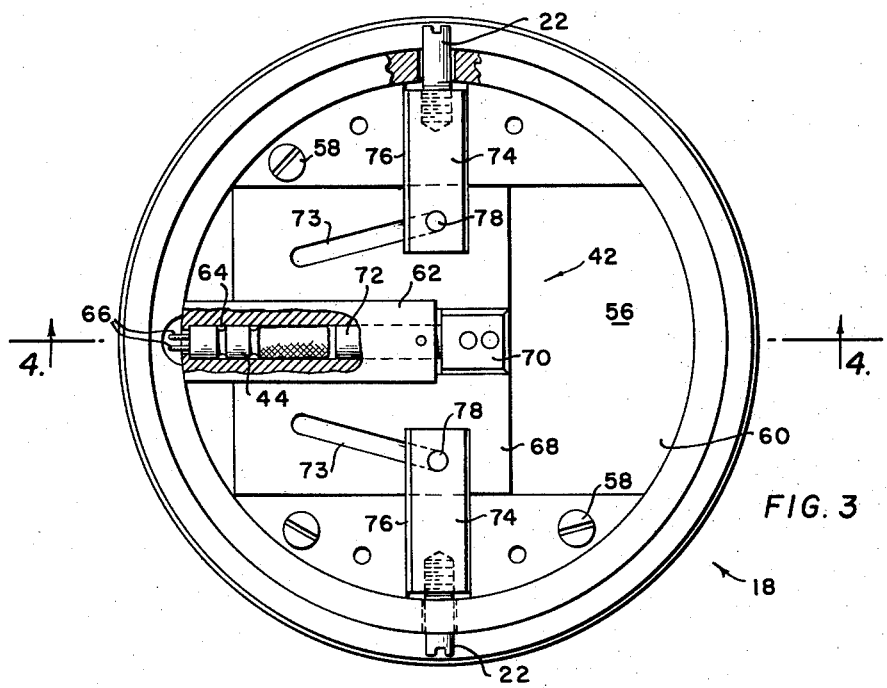
FIG. 3 is a plan view of a portion of the actuating mechanism utilized in conjunction with the instant invention.

Referring now to the drawings wherein like reference characters designate like or corresponding parts throughout the several views, there is shown in FIG. 1 a rocket head 10 produced in accordance with the instant invention.

The rocket head 10 comprises, a nose portion 12 having an annular ledge 14 on the interior thereof. The nose portion 12 is screwed into one end of a casing member 16 having removably attached to its opposite end an actuating mechanism 18 enclosed within a casing 20. The actuating mechanism 18 is connected to the casing 16 by a pair of retractable pins 22, hereinafter described in greater detail, and which extend through a pair of holes 24 formed at diametrically opposed sides of the casing 16.

A quantity of radar reflective material, such as dipoles or the like 26, is held enclosed within the casing 16 between a number of separator discs or plates 28 and surrounded by two semicircular sleeves 30. Each of the semicircular sleeves 30 has at its opposite ends an inwardly turned lip 32 which serves to retain, under tension, at each end of the sleeve a resilient wire ring 34 which is under tension, tending to expand while the entire apparatus is assembled in the condition shown in FIG. 1. The right hand end of each of the sleeves 30 abuts a free piston 36 slidably mounted within the casing 16, and which is provided with a rim 38 facing toward the nose portion 12. A compressed coil spring 40 is, as shown in FIG. 1, interposed between the piston 36 and the ledge 14 on the nose portion 12.

Thus when the actuating mechanism 18 goes into operation, in a manner hereinafter described, the actuating mechanism casing 20 is released from the shell 16 and the compressed coil spring 40 forces the material 26 out of the shell 16 in the manner shown in the exploded view in FIG. 2. At this point the rings 34 expand and force the semicylindrical shell members 30 away from the radar reflective material 26 so that said reflective material is dispersed into the surrounding wind currents so that it may then be tracked by ground or airborne radar.

Attention is directed to FIGS. 3–6 wherein is shown detailed views of the actuating mechanism 18. As previously pointed out, the actuating mechanism 18 is enclosed within the casing 20 which has a plurality of screw threads 41 on the exterior thereof whereby the rocket head 10 may be screwed into the end of a launching rocket.

The actuating mechanism 18 comprises a retractable locking mechanism 42 for locking the actuating mechanism to the shell 16 by means of the pair of retractable pins 22 which are adapted to retractably extend through the holes 24 in said shell. The locking mechanism 42 is actuated by an electrically activated detonator 44 which is energized by a battery 46 carried in a recess in the casing 20. The battery is connected to the detonator through a micro switch 48 which is adapted to be actuated at a predetermined interval after launching of the rocket head, by a mechanical timer 50. The timer 50 is held in locked position, prior to launching of the rocket, by a slidable key 52 held in the position shown in FIG. 4 by a slidable, spring biased plunger 54. The plunger 54 is driven upwardly, as viewed in FIG. 4, by the gases in the rocket upon launching of the rocket, so as to activate the mechanism 18 in a manner hereinafter described in greater detail.

The locking mechanism 42 is mounted upon a plate 56 removably mounted in the casing 20 by a plurality of screws 58, and is provided with a slot 60 extending diametrically thereof. The plate 56 is further provided with a block 62 in the slot 60 and extending upwardly therefrom, as viewed in FIG. 4. The block 62 is provided with an axially extending bore 64 open at the right hand end, as viewed in FIG. 3, to removably receive the detonator 44 and having at its opposite end a hole through which a pair of electrical leads 66, connected to the detonator 44, extend to the switch mechanism 48. The locking mechanism 42 further includes a U-shaped slide plate 68 that is substantially square in outline. The slide plate 68 is provided at the bight portion thereof with an upwardly extending block 70 having a rod or piston member 72 fixedly attached thereto, said piston 72 being adpted to extend into the bore 64 in the block 62 and have the free end thereof in juxtaposition with the detonator 44. Each of the arms of the U-shaped slide plate 68 is provided with a slot 73 extending diagonally thereof and sloping toward the center of the slide plate 68.

Each of the locking pins 22 has a threaded end portion that is screwed into a slide block 74, each of said slide blocks being slidably mounted in a slot 76 formed in the plate 60 and extending radially of the plate 60. Each slide block 74 is provided with a pin 78 extending downwardly therefrom and into the respective slots 73 so that as the slide plate 68 moves toward the right, as viewed in FIG. 3, to the position shown in FIG. 5, the slide blocks 74 are retracted toward the center of the actuating mechanism so as to cause the studs 22 to be retracted from the holes 24 in the shell 16.

The aforementioned locking mechanism 42 is of course actuated by the firing of the electrical detonator 44 which is adapted to be actuated by the closure of the microswitch 48. The switch 48 is actuated by depression of a spring arm 80 attached to the switch, by a part of the timer mechanism 50. Depression of the arm 80 serves to press a switch button 82 on the switch 48.

Figure 4:
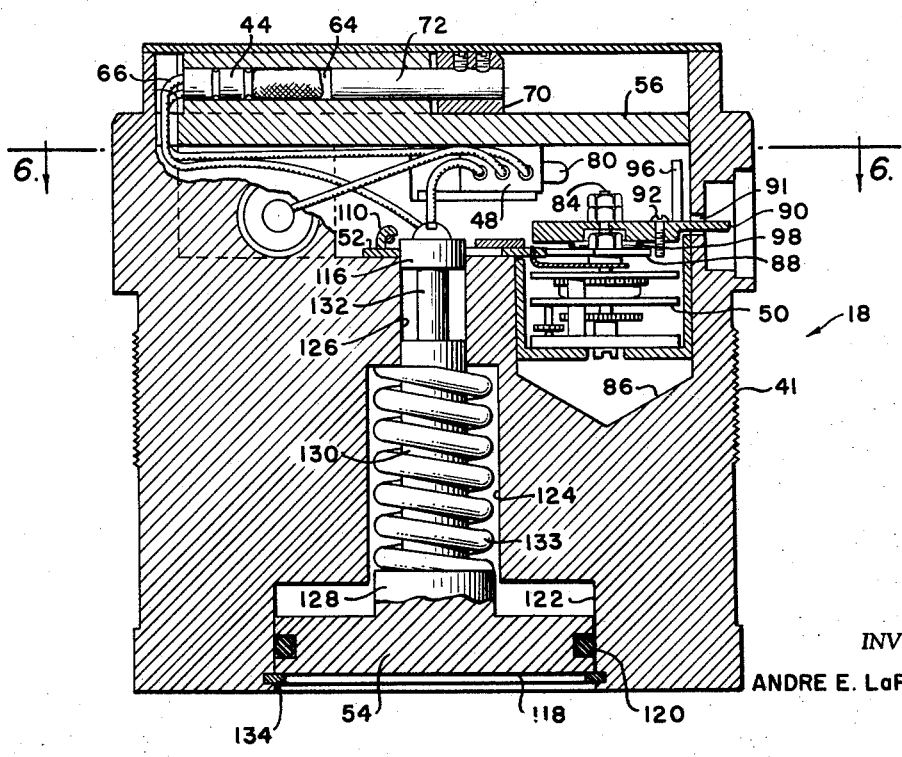
FIG. 4 is a sectional view taken on line IV—IV of FIG. 3.
Figure 6:
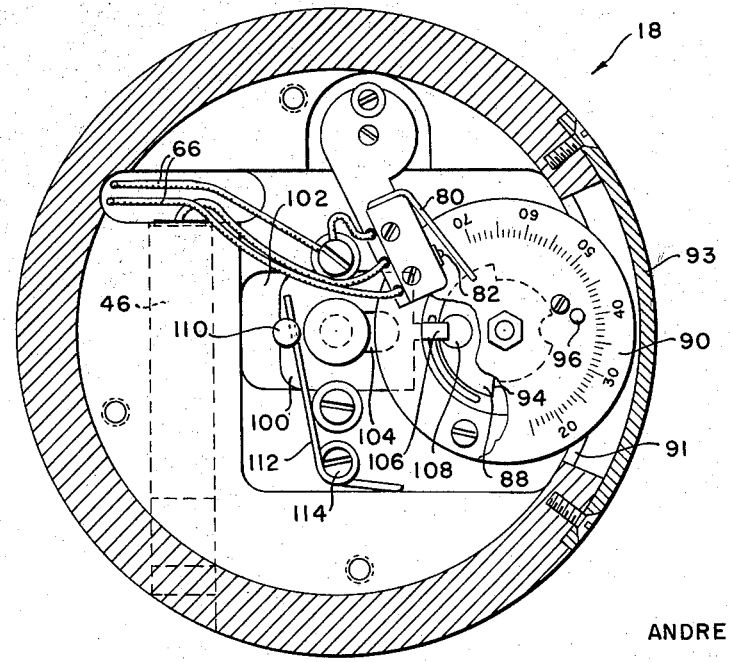
FIG. 6 is a sectional view taken on line VI—VI of FIG. 4.

Referring to FIGS. 4 and 6, the timer mechanism 50, which includes a rotatable shaft 84, is mounted in a recess 86 formed within the casing 20 and includes a clutch disc 88 fixedly mounted on the shaft 84 for rotation therewith. In addition the shaft 84 has mounted thereon a timer disc 90 having indicia thereon to indicate various preset time intervals for determining the time after firing of the rocket at which time the instant rocket head comes apart in the manner shown in FIG. 2. The timing disc 90 is free to rotate about the shaft 84 and has fixedly mounted thereon a downwardly extending stud 92 adapted to come in contact with a cam surface 944 on the clutch-plate 88. A portion of the timing disc 90 extends through a slot 91 formed in the casing 20, which slot is normally covered by a removable plate 93. The timing disc 90 is also provided with an upwardly extending switch actuating stud 96 fixedly mounted thereon and adapted to contact the switch actuating lever 80. There is interposed between the clutch plate 88 and the underside of the timing disc 90 a flexible and resilient O-ring 98 which is compressed between said clutch plate 88 and the timing disc 90 so that as the clutch plate 88 rotates, the timing disc 90 is caused to rotate due to the frictional interaction between the clutch plate 88, the O-ring 98 and the timing disc 90.

The timer mechanism 50 is conventional in construction and is spring wound prior to launching of the rocket.

The timer 50 is held in locked position by a slidable locking key 100 slidably mounted within a slot 102 formed in the casing 20. The locking key 100 is provided with a keyhole shaped slot 104 having an enlarged portion and a more narrow portion. In addition the locking key 100 is provided with a locking stud 106 adapted to selectively extend into a slot 108 formed in the clutch disc 88 so as to retain the timer mechanism 50 in locked position by preventing counterclockwise rotation of the clutch plate 88, as viewed in FIG. 6.

The locking key 100 is also provided with an upwardly extending stud 110 at the left hand end thereof, as viewed in FIGS. 4 and 6, which has in engagement therewith one end of a spring member 112 that is anchored by a screw 114 to the casing 20. The spring 112 by action upon the stud 110 normally tends to slide the locking key 100 toward the left, as viewed in FIG. 6.

Prior to firing of the rocket the locking key 100 is held in the position shown in FIGS. 4 and 6 by a cylindrical boss 116 mounted on the innermost end of the plunger 54. The plunger 54 also includes a piston-like portion 118 at its lower end adapted to be actuated by rocket gases and having a sealing O-ring 120 around the periphery thereof in contact with a recess 122 formed in the base of the casing 20. The casing 20 is further provided with a bore 124 of reduced diameter in communication with the recess 122 and in turn in communication, nearest its innermost end, with another bore 126 of still further reduced diameter. The piston 118 has affixed thereto a boss 128 having affixed to its innermost end a rod 130 to the innermost end of which is affixed a stud 132 to which the boss 116 is affixed. The rod 130 is surrounded by a coil spring 133 which is normally under compression and which tends to move the piston 118 outwardly of the casing 20 by bearing against the boss 128 at one end and against a portion of the casing 120 at the other end, as clearly shown in FIG. 4. The piston 118 is retained against movement out of the casing 20 by a snap ring 134 fixedly mounted in the recess 122.

Prior to launching of the rocket, the boss 132 is located in the enlarged portion of the key-hole slot 104 in the locking-key 100, as shown in FIGS. 4 and 6, thereby retaining the stud 106 in locking engagement with the clutch disc 88, so as to prevent counterclockwise rotation of the clutch disc 88 and thus the timing disc 90.

*Operation*

Figure 5:
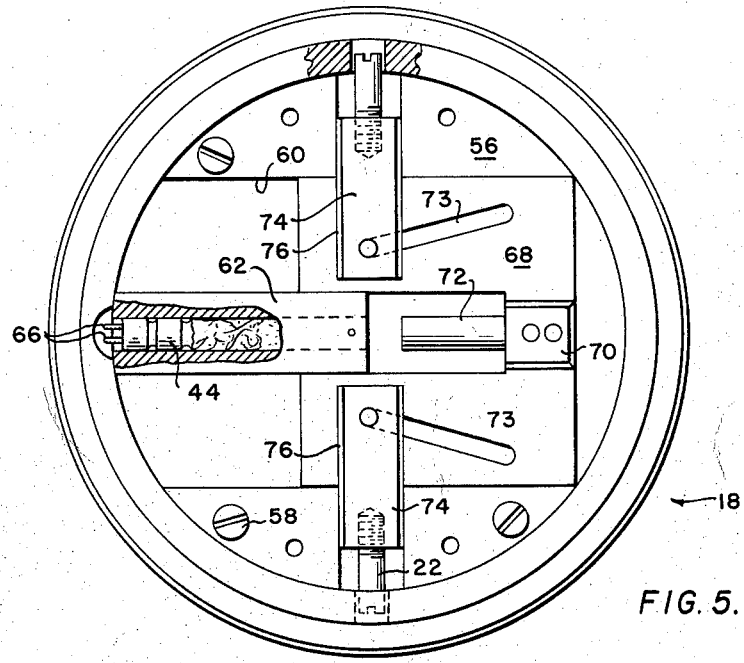
FIG. 5 is a plan view of the structure shown in FIG. 3 after said mechanism has gone through its operative cycle.

In assembling the instant mechanism prior to firing, the plate 56 is removed from the casing 20 by removal of the screws 58, the slide blocks 74 are lifted free of the plate 56 and the U-shaped plate 68 is retracted to the position shown in FIG. 5 whereby it may be lifted free of said plate 56. At this point the detonator 44 is inserted into the bore 64 and the wiring 66 is connected in the proper manner to switch 48 and the battery 46. The U-shaped plate 68 is replaced in the slot 60 and the piston or plunger 72 is inserted into the bore 64 as shown in FIG. 3. The slide blocks 74 are then reassembled on the plate 56 with the pins 78 being in the respective slots 73. The plate 56 is then re-attached to the casing 20. Prior to screwing the studs 22 into the respective slide blocks 74, the actuating mechanism 18 is inserted into the left hand end of the casing 16, after the assembly into said casing of the various other elements contained therein. At this point the locking studs 22 are inserted in the holes 24 and screwed into the outermost end of the respective slide blocks 74, thereby locking the actuating mechanism to the shell 16 of the rocket head 10.

As indicated above, prior to launching of the instant rocket head, the apparatus is in the condition shown in FIGS. 4 and 6 with the locking key 100 in timer locking position. Prior to launching of the rocket head 10, the timing disc 90 is set to a predetermined time interval after which time it is desired that the rocket disassemble to distribute the radar reflective material 26. This is done by removing the cover plate 93 located over the slot 91 through which a portion of the timing disc 90 extends toward the exterior of the casing 20. After the timing disc has been set for the predetermined interval of time, the plate 93 is replaced on the casing 20 and the apparatus is launched by firing the rocket.

Upon firing of the rocket the gases within said rocket cause the cylinder 118 to be depressed into the recess 122, thereby moving the boss 132 upwardly, as viewed in FIG. 4, out of the key-hole slot 104 in the locking key 100, thereby allowing the spring 112 to move said locking key 100 to the left, as viewed in FIG. 6, so that the narrow portion of the key-hole slot surrounds the stud 132 so as to retain the plunger 54 in retracted position and at the same time remove the locking stud 106 on the key 100 from the slot 108 in the clutch plate 88. At this time the mechanical timer 50 commences operation and is so constructed as to cause counterclockwise rotation of the disc 88, as viewed in FIG. 6, with ensuing counterclockwise rotation of the timing disc 80 thru the action of the friction O-ring 98.

As the timing disc 90 rotates the stud 96, after the predetermined time interval, comes into contact with the switch actuating finger 80 depressing said finger which in turn depresses the button 82 closing the microswitch 48. Upon closure of the switch 48, the battery energized circuit to the detonator 44 is completed with the result that the detonator explodes. The resultant expanding gases within the bore 64 act upon the piston rod 72 to drive the same toward the right, as viewed in FIG. 4, causing the locking mechanism 42 to be moved from the position shown in FIG. 3 to the position shown in FIG. 5, with the result that the interaction between the slots 73 and the studs 78 causes retraction of the locking studs 22 from within the holes 24 in the casing 16.

At this point the spring 40 in the rocket head comes into action and forces the contents of the rocket head 10 into essentially the position shown in FIG. 2, thereby releasing the radar reflective material 26 from the shell 16.

After the radar reflective material 26 is released from the casing 16, naturally most of the parts drop to the ground and the radar reflective material is carried along on the wind currents into which it has been launched, thereby allowing radar tracking of said wind currents.

It is reemphasized that the instant invention provides a means for launching a quantity of radar reflective material into high altitude wind currents in as short a period of time as possible, and more particularly in a period of time substantially less than that required for example in the use of balloons for radar tracking of wind currents. In addition, the instant invention is substantially foolproof and relatively simple in construction. In the event that the actuating mechanism 18 can be retrieved after launching it can be used over again in subsequent launchings, due to the sturdy nature of the construction of the casing 20 in which said actuating mechanism is contained.

It should be understood, of course, that the foregoing disclosure relates to only a preferred embodiment of the invention and that numerous modifications or alterations may be made therein without departing from the spirit and scope of the invention as set forth in the appended claims.

What is claimed is:

1. A rocket head comprising means for substantially uniform distribution of filamentary material at high altitude, said means including, a forward hollow portion, a rear casing removably connected to said forward portion, a quantity of filamentary material within said forward portion, means tending to eject said filamentary material from said forward portion upon removal therefrom of said rear casing, said rear casing including, a slidable latch means adapted to removably lock said rear casing to said forward portion, a slidable plate connected to said slidable latch means, said slidable plate having a cam means thereon, a cam follower on said latch means and in engagement with the cam on said plate, plate actuating means for sliding said slidable plate relative to said rear casing to remove said latch means from engagement with said forward portion, a timing mechanism in said rear casing adapted to actuate said plate actuating means at a predetermined interval of time after launching of the rocket head, whereby the rear casing is disconnected from said forward portion at a predetermined time following launching of the rocket head, thereby allowing ejection of said filamentary material from said forward portion.

2. A rocket head comprising means for substantially uniform distribution of filamentary material at high altitude, said means including, a forward portion, a rear casing removably connected to said forward portion, a quantity of filamentary material within said forward portion, means tending to eject said filamentary material from said forward portion upon removal therefrom of said rear casing, said rear casing including a slidable latch means mounted therein, said latch means being removably engaged with said forward portion to maintain said rear casing in connection with said forward portion, a slide plate slidably mounted in said casing, said slide plate having cam means thereon, cam follower means on said slidable latch means in engagement with the cam means on said slide plate, said rear casing having an elongated bore formed therein, a piston fixedly connected to said slide plate and movably mounted within said bore, an electrically actuated detonator cap mounted within said bore in juxtaposed relation with said piston, whereby explosion of said detonator cap causes sliding movement of said piston and slide plate relative to said rear casing with ensuing retraction of the slidable latch means from engagement with said forward portion by the interaction of said cam means and said cam follower, and means for actuating said detonator cap after launching of the rocket head whereby the rear causing member is disconnected from the forward portion of the rocket head thereby allowing ejection of said filamentary material from said forward portion.

3. A rocket head as set forth in claim 2 wherein, said filamentary material is a quantity of finely divided radar reflective material, whereby ambient wind currents may be tracked by radar after ejection of said radar reflective material into said wind currents.

4. A rocket head as set forth in claim 2 wherein the cam means on said slide plate comprises plurality of slots formed in said slide plate equal in number to the number of slidable latch members, said slots extending at an angle to the direction of movement of said slide plate, and wherein each of said cam followers comprises a detent fixedly mounted on each of said slidable latch members and in slidable engagement with the respective slots.

5. A rocket head comprising, a forward portion, a rear casing removably connected to said forward portion, a quantity of filamentary material within said forward portion, means tending to eject said filamentary material from said forward portion upon removal therefrom of said rear casing, said rear casing including a slidable latch means mounted therein, said latch means being removably engaged with said forward portion to maintain said rear casing in connection with said forward portion, a slide plate slidably mounted in said casing, said slide plate having cam means thereon, cam follower means on said slidable latch means in engagement with the cam means on said slide plate; said rear casing having an elongated bore formed therein, a piston member fixedly connected to said slide plate and movably mounted within said bore, an electrically actuated detonator cap mounted within said bore in juxtaposed relation with said piston, whereby explosion of said detonator cap causes sliding movement of said slide plate relative to said rear casing with ensuing retraction of the slidable latch means from engagement with said forward portion by the interaction of said cam means and cam follower; a timer mechanism mounted in said rear casing, said timer mechanism being adapted to actuate said detonator actuating means, means maintaining said timing mechanism in locked position prior to launching of the rocket head and means for releasing said timing mechanism for movement upon launching of the rocket head, whereby the detonator cap is exploded at a predetermined time interval after launching of the rocket head, whereby the rear casing member is separated from said forward portion at a predetermined time after launching of the rocket head thereby allowing ejection of said filamentary material from said forward portion of the rocket head.

6. A rocket head as set forth in claim 5 wherein the cam means on said slide plate comprises a plurality of slots formed in said slide plate equal in number to the number of slidable latch members, said slots extending at an angle to the direction of movement of said slide plate, and wherein each of said cam followers comprises a detent fixedly mounted on each of said slidable latch members and in slidable engagement with the respective slots.

7. A rocket head comprising, a forward portion, a rear casing removably connected to said forward portion, a quantity of filamentary material within said forward portion, means tending to eject said filamentary material from said forward portion upon removal therefrom of said rear casing, said rear casing having a slidable latch means mounted therein, said latch means being removably engaged with said forward portion to maintain said rear casing in removable connection with said forward portion, a slide plate slidably mounted in said rear casing, said slide plate having cam means thereon, cam follower means on said slidable latch means in engagement with the cam on said slide plate; said rear casing having an elongated bore formed therein, a piston member fixedly connected to said slide plate, and movably mounted within said bore, an electrically actuated detonator cap mounted within said bore in juxtaposed relation with said piston whereby explosion of said detonator cap causes sliding movement of said slide plate relative to said rear casing with ensuing retraction of the slidable latch means from engagement with said forward portion by the interaction of said cam means and cam follower means, and switch actuated electrical means for actuating said detonator cap; a timer mechanism mounted in said rear casing, a rotatable member on said timing mechanism adapted for rotation thereby, said rotatable member having a slot formed in the periphery thereof, a locking key slidably mounted on said rear casing and having a portion thereof in engagement within said slot to maintain the timer mechanism locked against rotation, resilient means tending to bias said locking key out of engagement with said timing mechanism, retaining means holding said locking key against movement out of engagement with said timer mechanism, said retaining means being disengageable from said locking key upon launching of the rocket head whereby said timer mechanism is released for movement upon said launching, said timer mechanism being adapted to close the detonator actuating switch after a predetermined time interval following launching of the rocket head and release of the timer mechanism, whereby said detonator cap is exploded at a predetermined time interval following launching of the rocket thereby moving said slide plate relative to the rear casing so as to disengage said latching members from said forward portion of the rocket head thereby allowing separation of said forward portion and the rear casing; thus allowing ejection of the filamentary material from said forward portion at a predetermined time interval after launching of the rocket head.

8. A rocket head as set forth in claim 7 wherein, said filamentary material is a quantity of finely divided radar reflective material, whereby ambient wind currents may be tracked by radar after ejection of said radar reflective material into said wind currents.

References Cited in the file of this patent

UNITED STATES PATENTS

| | | |
|---|---|---|
| 1,621,421 | Kunzer | Mar. 15, 1927 |
| 2,398,740 | Halvey | Apr. 16, 1946 |
| 2,476,302 | Jeppson | July 19, 1949 |
| 2,489,984 | Shoemaker | Nov. 29, 1949 |
| 2,524,591 | Chandler | Oct. 3, 1950 |
| 2,779,283 | Baughman | Jan. 29, 1957 |